US010247628B2

(12) United States Patent
Burdet et al.

(10) Patent No.: US 10,247,628 B2
(45) Date of Patent: Apr. 2, 2019

(54) FORCE MEASUREMENT MECHANISM

(71) Applicant: Imperial Innovations Limited, London (GB)

(72) Inventors: Etienne Burdet, London (GB); Michael Alec Vere Mace, London (GB); Jean-Luc Liardon, Forel (CH); Paul Bentley, London (GB); Paul Rinne, London (GB)

(73) Assignee: IMPERIAL INNOVATIONS LIMITED, London (GB)

( * ) Notice: Subject to any disclaimer, the term of this patent is extended or adjusted under 35 U.S.C. 154(b) by 0 days.

(21) Appl. No.: 15/544,596

(22) PCT Filed: Jan. 19, 2016

(86) PCT No.: PCT/GB2016/050107
§ 371 (c)(1),
(2) Date: Jul. 19, 2017

(87) PCT Pub. No.: WO2016/116738
PCT Pub. Date: Jul. 28, 2016

(65) Prior Publication Data
US 2018/0010972 A1    Jan. 11, 2018

(30) Foreign Application Priority Data

Jan. 19, 2015 (GB) .................................. 1500840.2

(51) Int. Cl.
*A63B 22/00* (2006.01)
*G01L 5/00* (2006.01)
(Continued)

(52) U.S. Cl.
CPC .......... *G01L 5/0057* (2013.01); *A63B 21/045* (2013.01); *A63B 23/12* (2013.01);
(Continued)

(58) Field of Classification Search
None
See application file for complete search history.

(56) References Cited

U.S. PATENT DOCUMENTS

| 3,603,153 A | 9/1971 | Schmaus |
| 3,906,788 A | 9/1975 | Hoffman |

(Continued)

FOREIGN PATENT DOCUMENTS

| DE | 3823970 A1 | 11/1989 |
| DE | 102012219203 B3 | 11/2013 |

(Continued)

*Primary Examiner* — Stephen R Crow
(74) *Attorney, Agent, or Firm* — William J. Clemens; Shumaker, Loop & Kendrick, LLP (57) ABSTRACT

A force measurement mechanism comprises two force input members (105, 106), a pair of cantilever springs (101, 102), and a force measuring means (107). One portion of each cantilever spring is held by a first constraint means (103) and one portion of each cantilever spring is held by a second constraint means (104) with each cantilever spring having an unconstrained length between the first and second constraint means that is free to bend. The constraint means (103, 104) hold the cantilever springs (101, 102) in a parallel and spaced apart arrangement. The force input members (105, 106) are attached via the constraint means so that relative movement of the force input members bends the cantilever springs (101, 02), and the force measuring means (107) is arranged to measure force applied between the force input members.

20 Claims, 4 Drawing Sheets (51) Int. Cl.
*A63B 21/045* (2006.01)
*A63B 23/12* (2006.01)
*A63B 23/16* (2006.01)
*A63B 24/00* (2006.01)

(52) U.S. Cl.
CPC .......... *A63B 23/16* (2013.01); *A63B 24/0062* (2013.01); *A63B 2220/51* (2013.01); *A63B 2220/833* (2013.01); *A63B 2225/09* (2013.01); *A63B 2225/50* (2013.01)

(56) References Cited

U.S. PATENT DOCUMENTS

| | | | |
|---|---|---|---|
| 4,091,680 A | | 5/1978 | Block |
| 4,858,145 A | * | 8/1989 | Inoue ................. G01G 3/16 177/210 FP |
| 5,313,023 A | | 5/1994 | Johnson |
| 5,317,916 A | | 6/1994 | Kovacevic |
| 6,237,399 B1 | * | 5/2001 | Shivaram ............. B82Y 35/00 73/105 |
| 6,537,075 B1 | | 3/2003 | Valero-Cuevas |
| 2007/0119248 A1 | | 5/2007 | Lee |

FOREIGN PATENT DOCUMENTS

| | | |
|---|---|---|
| EP | 0200555 A2 | 11/1986 |
| EP | 2218401 A1 | 8/2010 |
| GB | 2123157 A | 1/1984 |
| WO | 9848698 A1 | 11/1998 |
| WO | 0217784 A1 | 3/2002 |

\* cited by examiner

FORCE MEASUREMENT MECHANISM

The present invention relates to a force measurement mechanism which has application in rehabilitation aids, and in interfaces to computers and robotic systems.

Cognitive, and in particular attentional, capacity is critical for the brain's ability to rewire and re-learn functional movements after injury. The role of traditional therapy for people with arm and hand weakness is to perform and repeat tasks that are needed for daily living, combining both cognitive and movement aspects. Increased time and intensity of such therapy is known to improve patient recovery outcomes.

Many therapies to date are either efficacious—e.g. supervised physiotherapy, robotics—but limited by resources; or are resource-efficient—e.g. internet-based exercises, therapeutic play-dough—but suffer from lack of evidence, physical restrictions, or motivate patients poorly. Particular examples include; Nintendo-Wii™ type interfaces that do not allow force sensing and are inaccessible for most patients, or Tyromotion's 'Pablo'™ handle that provides force sensing, but is not compliant, which limits the control and feedback of force. On top of this, current internet based/mobile application (App) rehabilitation software that utilises mobile hardware (tablet and smartphone technologies) does not involve training functionally useful movements and instead it focuses on clicking, tapping the screen and swipe movements.

The invention provides a force measurement mechanism comprising two force input members, a pair of cantilever springs, and a force measuring means. One portion of each cantilever spring may be held by a first constraint means and one portion of each cantilever spring may be held by a second constraint means with each cantilever spring having an unconstrained length between the first and second constraint means that is free to bend. The constraint means may hold the cantilever springs in a parallel and spaced apart arrangement. The force input members may be attached via the constraint means so that relative movement of the force input members bend the cantilever springs. The force measuring means may be arranged to measure force applied between the force input members. The force may be applied in compression or in extension providing friction- and backlash-free force sensing.

The force measuring means may comprise a force sensor, such as a load cell, or it may be arranged to measure variations in distance between two parts of the mechanism, for example between the two force input members. It will be appreciated that the distance between the input members, or between one of the input members and one or more other parts of the mechanism, will vary with the force applied to the force input members, such that the distance can be used as a measure of the force applied. Alternatively the force measuring means may comprise a flex sensor arranged to measure flexing of at least one of the springs.

The unconstrained lengths of the two cantilever springs may be equal. The cantilever springs may be arranged to remain parallel during bending when a force is applied between the force input members.

The mechanism may further comprise a second pair of cantilever springs wherein one portion of each of the second pair of cantilever springs may be held by the first constraint means. One portion of each of the second pair of cantilever springs may be held by a third constraint means with each of the second pair of cantilever springs having an unconstrained length between the first and third constraint means that is free to bend. The constraint means may hold each pair of cantilever springs in a parallel and spaced apart arrangement. It will be appreciated that the mechanism may comprise a plurality of pairs of cantilever springs, for example 3, 4, 5 or more pairs of springs.

The first constraint means may constrain both pairs of cantilever springs relative to each other. The second and third constraint means may each be individual constraint means which can move relative to one another when a force is applied between the force input members. The force input members may be attached to the individual constraint means. The force input members may be arranged to fit within a person's hand.

When a force is applied between the force input members the second pair of cantilever springs may be arranged to bend in a shape which mirrors the first pair. A compliance adjustment member may be fitted to the cantilever springs which is operable to adjust the effective bending length of the cantilever springs.

The compliance adjustment member may define a series of openings and the cantilever springs may extend through the openings. The position of the compliance adjustment member along the cantilever springs may be controlled by a threaded spindle which engages with a threaded hole in the compliance adjustment member. Alternatively it may be slidable along the springs and adjusted using a protrusion directly extending from the compliance adjustment member itself.

The mechanism may further comprise a wireless transmission device for transferring force measurement data from the force measuring means to a remote device. The mechanism may further comprise a motion sensing unit arranged to sense motion of the mechanism (in free space). The motion sensing unit may comprise any of the following: accelerometer, a gyroscope and a magnetometer. The motions sensed may comprise velocity, orientation and gravitational forces of the mechanism. The mechanism may further comprise a vibration generating means which provides tactile feedback. The vibration generating means may be attached to one of the force inputs members. The vibration generating means may comprise vibratory motors.

The mechanism may provide force, position and tactile feedback. For example the mechanism may further comprise actuation means arranged to provide tactile feedback or stimulus to a user. The actuation means may be attached to one of the force input members, or may be attached to another part of the device. The actuation means may be arranged to produce at least one of: vibration and shape variation and size variation of at least one of the force input members.

The mechanism may further comprise a removable cover for at least one of the force input members whereby at least one of the shape and size and texture of the force input member can be altered.

The invention also provides a system comprising a computer device arranged to run a program and a force measurement mechanism, wherein the computer device is arranged to receive a force measurement signal from the force measuring means as an input when running the program. The system may be a rehabilitation system.

The mechanism may further comprise any one or more features, in any workable combination, or the preferred embodiments of the present invention which will now be described, by way of example only, with reference to the accompanying drawings.

Figure 1:
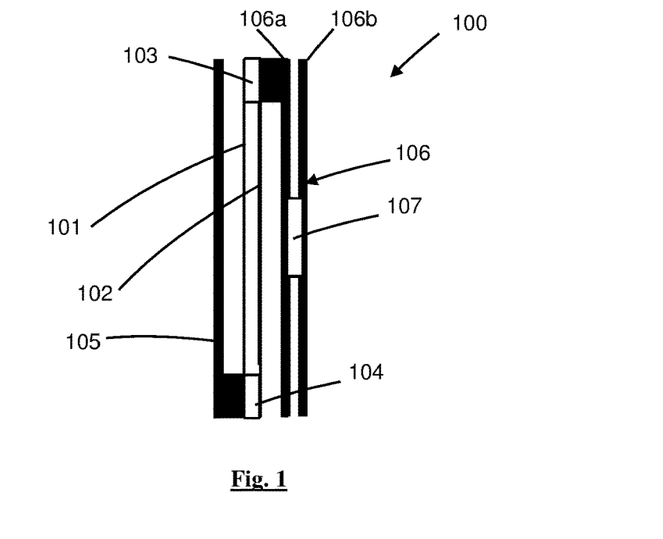
FIG. 1 shows a force measurement mechanism according to an embodiment of the present invention.

FIG. 1 shows a force measurement mechanism 100 comprising a pair of cantilever springs 101 and 102 positioned between two opposing force input members 105 and 106. The cantilever springs, each of which comprises a strip of resilient material such as spring steel, are arranged parallel to, and are spaced apart from, one another. The cantilever springs extend between a pair of constraint blocks 103 and 104. The cantilever springs are attached to the constraint blocks with constraints which may be any means of fixing the cantilever spring relative to the constraint block such as clamping, bonding, or welding for example. In this example end portions of each cantilever spring are constrained on the face of a constraint block 103, 104 cantilever. The force input members 105, 106 are each rigidly attached to one of the respective constraint blocks and extend parallel to the cantilever springs and spaced apart from them in the neutral (unloaded) state. The force input members 105, 106 extend along the whole length of the cantilever springs 101, 102 and spaced apart from them. One of the force input members 106 is in two parts having an inner part 106a connected to the constraint and an outer part 106b connected to the inner part with a load cell 107 so that if the outer surfaces of the force input members are pushed together the load cell will measure the force applied. Alternatively the load cell 107 could be connected directly on one side to the constraint block 103 and to a single force input member on the opposite side.

When a force is applied between the force input members 105, 106 bending is induced in the cantilever springs 101, 102. The cantilever springs remain parallel during bending, and because the unconstrained lengths of the cantilever springs are equal the constraint blocks, and the opposing surfaces of the constraint blocks, also remain parallel and do not rotate. The force input members therefore remain substantially parallel when a force is applied between them.

Figure 2:
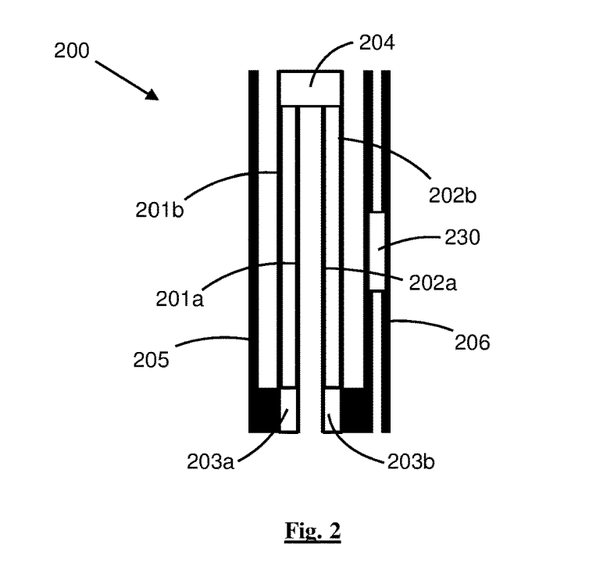
FIG. 2 shows a force measurement mechanism according to a second embodiment of the present invention.

Referring to FIG. 2, a force measurement mechanism 200 comprises a pair of force input members 205, 206 which are arranged parallel to, and spaced apart from, one another. A first pair of parallel cantilever springs 201a and 201b, and a second pair of parallel cantilever springs 202a and 202b are positioned between the force input members 205, 206. All four of the cantilever springs are spaced apart from one another in parallel planes. The cantilever springs are also parallel to the force input members in the neutral (unloaded) state.

Each of the two pairs of cantilever springs extend between a common constraint block 204 and one of two individual constraint blocks 203a, 203b. The first pair of cantilever springs 201a, 201b extends between the common constraint block 204 and individual constraint block 203a. The second pair of cantilever springs 202a, 202b extends between the common constraint block 204 and individual constraint block 203b. A portion of each cantilever spring is constrained at the common constraint block 204 and a portion of each beam is constrained at one of the individual constraint blocks 203. The first pair of cantilever springs 201 have constraints in the individual constraint block 203a and the second pair of cantilever springs 202 have constraints in the other individual constraint block 203b.

In the common constrain block 204 the four constraints for the two pairs of cantilever springs fix a portion of the cantilever springs 201a, 201b, 202a, 202b in a parallel, and linearly spaced apart, position. The individual constraint blocks 203 fix a portion of each pair of cantilever springs 201a, 201b or 202a, 202b in a parallel, and spaced apart, position but the individual constraint blocks 203a 203b are separate blocks which allow the ends of one pair of cantilever springs 201 to move relative to the ends of the other pair of cantilever springs 202. The individual constraint blocks 203 are held substantially parallel to one another by the cantilever springs.

The force input members 205 and 206 are each connected to a separate individual constraint block 203a, 203b. The left hand force input member 205 is connected to the corresponding left hand individual constraint block 203a, and the right hand force input member 206 is connected to the corresponding right hand individual constraint block 203b. The force input members 205, 206 are rigid members. Each force input member extends from its connection with the individual constraint block 203 in a direction parallel to the unbent cantilever springs towards the common constraint block 204.

One of the force input members 206 is in two parts having an inner part connected to the constraint 203b and an outer part connected to the inner part with a load cell 230 so that if the outer surfaces of the force input members 205, 206 are pushed together the load cell 230 will measure the force applied. Alternatively the load cell 230 could be connected directly on one side to the constraint block 203b and to a single force input member on the opposite side.

When a force is applied between the force input members 205, 206 bending is induced in both pairs of cantilever springs 201, 202. The cantilever springs in each pair remain parallel during bending, and because the unconstrained lengths of the cantilever springs are equal the constraint blocks 204, 203a, 203b, and the opposing surfaces of the constraint blocks, also remain parallel and do not rotate. The force input members 205, 206 therefore remain substantially parallel when a force is applied between them.

Figure 3:
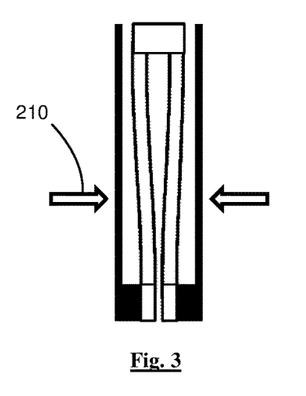
FIG. 3 shows the mechanism of FIG. 2 in a compressed position.

In the neutral position shown in FIG. 2 the cantilever springs 201, 202 and force input members 205, 206 all lie in parallel planes. Referring to FIG. 3, when a compressive force 210 is applied between the force input members 205, 206 the cantilever springs bend between the constrained portions. The cantilever springs in each pair bend parallel to one another and each pair of cantilever springs bend in a shape which mirrors the bending in the other pair of cantilever springs. As the cantilever springs bend, the constraint blocks 203, 204 do not rotate, all constraint blocks remain orientated parallel to each other. Each cantilever spring acts like a link in a parallelogram linkage where the opposing sides always remain parallel. Therefore the force input member 205, 206 connected to the individual constraint blocks 203a, 203b do not rotate under the compression force (or a tension force) and remain parallel to each other while moving inwards in the direction of the compression force.

The load cell 230 measures a force applied between the force input members 205, 206. It will be appreciated that as no guide mechanisms are required to keep the force input members parallel, there is no friction or backlash during movement. The sensitivity of the system is therefore only limited by the resolution of the electronics associated with the load cell (i.e. pre-amplification and data acquisition).

Figure 4:
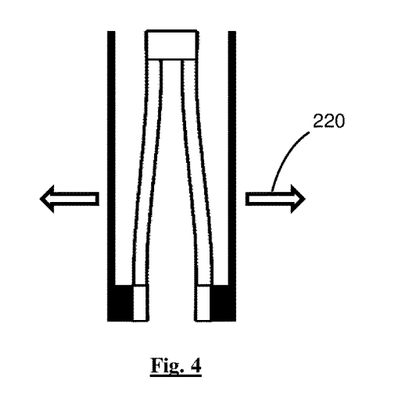
FIG. 4 shows the mechanism of FIGS. 2 and 3 in an extended position.

In FIG. 4 a pulling force 220 is applied to each force input member 205, 206 which has the effect of bending the cantilever springs in opposite directions to the compressive force 210. This may be achieved by using straps which hold the force input members to the thumb and forefinger of a person's hand. Again the force input members are maintained parallel with no rotation of the constraint blocks.

Figure 5:
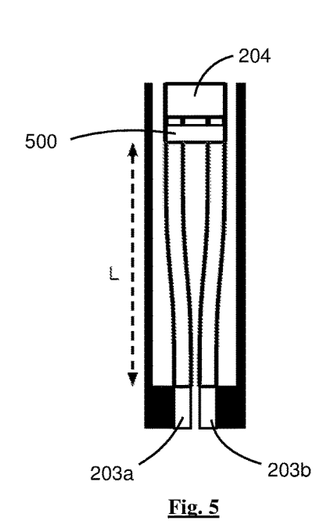
FIG. 5 shows a modification of the mechanism of FIGS. 2 to 4 which allows adjustable compliance.
Figure 6:
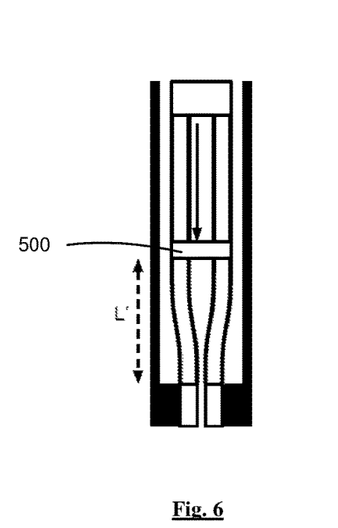
FIG. 6 shows the mechanism of FIG. 5 with reduced compliance.

FIG. 5 shows a force measurement mechanism with adjustable resilience. The mechanism is the same as the mechanism of FIG. 2 with an additional adjustable compliance block (ACB) 500. The ACB 500 has four openings one for each cantilever spring and can slide along the length of the cantilever springs. Each opening fits closely around each cantilever spring and locates each cantilever spring relative to the other cantilever springs. The stiffness of the mechanism can be increased by reducing the effective (unconstrained) length (L) of the cantilever springs. This is done by sliding the ACB 500 away from the position nearest the common constraint block 204 towards the individual constraint blocks 203 as shown in FIG. 6. The compliance is reduced because to achieve the same compressed position with a reduced effective length the cantilever springs must be bent through a tighter arc and the extra bending required increases the stiffness of the mechanism.

Figure 7:
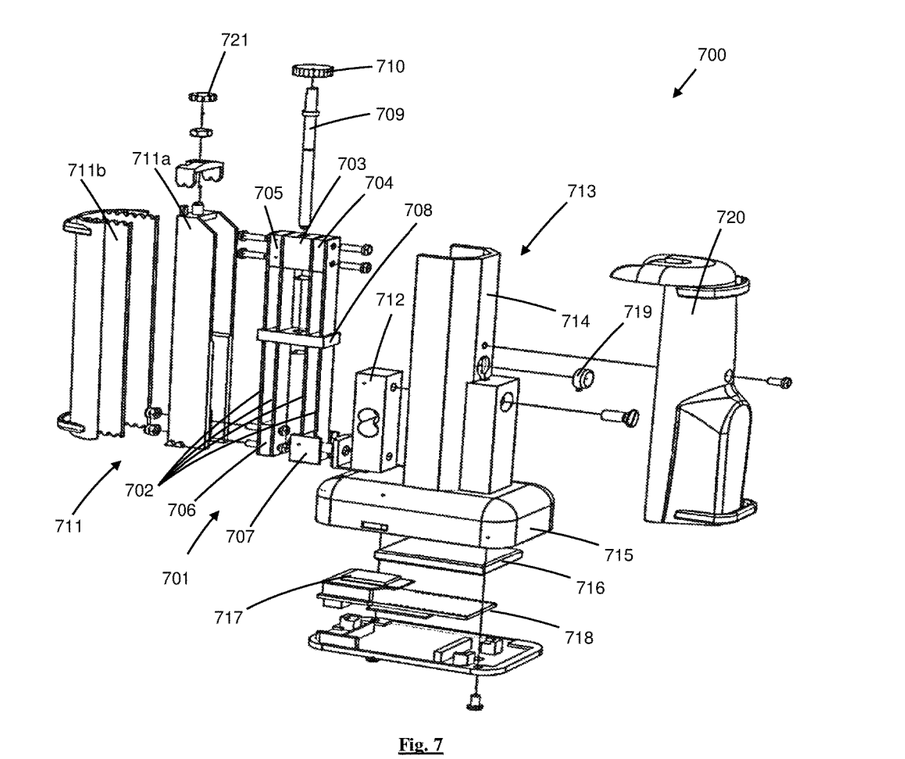
FIG. 7 shows an exploded view of a rehabilitation aid according to a further embodiment of the present invention.

FIG. 7 shows a stroke rehabilitation aid 700 in accordance with a further embodiment of the invention. The rehabilitation aid 700 comprises a force measurement mechanism 701 with adjustable compliance which is equivalent to the mechanism described in FIGS. 5 and 6. The mechanism 701 has four cantilever springs 702 which are formed from thin strips of spring steel.

The common constraint block is formed from three blocks of plastic (PLA) (or other suitable material such as stainless steel), a first block 704 separates the ends of one pair of cantilever springs, a second separating block 704 separates the ends of the second pair of cantilever springs, and a third separating block 703 separates the two pairs of cantilever springs. A pair of bolts is used to secure each separating block to the third (central) separating block 703, and the bolts clamp the ends of the cantilever springs between the separating blocks. The individual constraint blocks 706 and 707 are bolted between the opposite ends of the cantilever springs. The ends of the cantilever springs are therefore constrained at the opposing faces of the constraint blocks. Alternatively, it will be appreciated that the cantilever springs and constraint blocks could be manufactured as a single piece.

The force measurement mechanism 701 has an ACB 708 arranged to slide up and down the length of the cantilever springs in the same way as ACB shown in FIGS. 5 and 6. The first separating block 703 has a hole which passes straight through the block in a direction parallel to the cantilever springs. A threaded spindle 709 is located within the hole and extends down between the pairs of cantilever springs. A threaded hole is formed in the centre of the ACB 708 and the threaded spindle 709 passes through the threaded hole and engages the ACB via the threads.

The aid 700 comprises two force input members 711 and 713. One of the force input members 711 comprises an adjustable grip 711b and a support 711a where the adjustable grip can be positioned relative to the support. The support 711b is bolted at one end to one of the individual constraint blocks 706 using the bolts which also secure the cantilever springs. The support 711a extends in an adjacent and parallel direction to the cantilever springs to an opposite free (unconstrained) end. The support 711a has a channel section providing a stiff non flexible structure. The adjustable grip 711b fits over the support 711a and may be located relative to the support via a series of teeth and a locking mechanism 721 which allows the teeth to engage and disengage to secure or adjust the position of the adjustable grip so the circumference of the grip can be increased or reduced to suit different hand sizes. Other adjustment mechanisms such as grub screws may of course be used.

A load cell 712 is fitted to the third constraint block 707 and lies between second force input member 713 and an outer cantilever spring 702. The second force input member 713 comprises a support 714 and a base 715 which has an internal compartment inside housing a battery 716, a Bluetooth communication device 717 and printed circuit board (PCB) 718. A vibration motor 719 is secured to the support 714 and receives power from the battery 716 and control signals from the PCB 718. A fixed grip 720 is bolted to the support 713 adjacent to the adjustable grip 711b. The PCB 718 consists of a microprocessor, analogue signal conditioning sub-circuits and connectors. Additional on-board sensors can also be included on the PCB 718 such as inertial measure units (consisting of accelerometers, gyroscopes and magnetometers) to enable tracking the motion of the hand through space for instance.

In use, the rehabilitation aid 700 provides an assessment and rehabilitation aid for patients suffering from arm weakness or a deficit in hand dexterity secondary to brain injury (e.g. as a result of stroke, multiple sclerosis, traumatic brain injury etc.). A patient's grip strength can be assessed by the patient squeezing the adjustable grip 711 and the fixed grip 720. As the patient grips the aid, the cantilever springs 702 of the force measurement mechanism 701 will bend inwards allowing the force input members of the fixed and adjustable grip to move together. Force applied to the grip will be transferred through the load cell 712 which sends signals indicative of the force via the PCB 718 to the Bluetooth device 717 for transmission to a remote device such as a tablet 800. Of course other means of signal transmission may be used such as by cable, infra-red, or Wi-Fi network.

Figure 8:
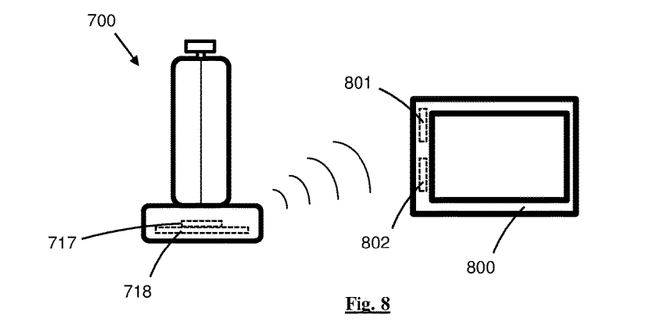
FIG. 8 shows the rehabilitation aid of FIG. 7 communicating with a remote device.

FIG. 8 shows the rehabilitation aid 700 communicating with a remote device which in this example is a tablet 800. The tablet comprises a Bluetooth transmitter/receiver 801 and a processor 802. The rehabilitation aid 700 can send and receive signals from the tablet via its Bluetooth device 717. The tablet has a computer game running on its processor which requires a patient to provide certain force inputs using the rehabilitation aid. The game is designed to place demands on the patient's fine-motor skills and attentional capacities.

Alerts may be sent to the patient from the tablet 800 by the tablet transmitting a Bluetooth signal to the rehabilitation aid which is received by the Bluetooth device 717 and sent via the PCB 718 to the vibration motor 719. The vibration motor 719 can provide tactile feedback to the user for example it can be activated when a predetermined force has been achieved or after a certain number of force inputs. The alerts may be generated in the PCB 718 or by an external device.

Rotating the spindle controls the position of the ABC along the length of the cantilever springs 702. A knob 710 is provided on top of the spindle 709 to allow the spindle to be rotated by hand.

The aid can be adjusted to fit a patient's hand by moving the adjustable grip 711b relative to the support 711a to widen or narrow the grip. This is achieved by releasing the locking mechanism 721, moving the adjustable force input member relative to the teeth on the support 771a, and retightening the locking mechanism.

The functional movement of gripping/squeezing is particularly important for daily living. The rehabilitation aid is an affordable, accessible and highly sensitive device capable of recording patient grip strength across a wide range of forces (including flicker movements in the most severely impaired >0.1N). Through Bluetooth the hand-grip is able to connect to all compatible digital hardware (PC, Tablet, Mobile) and allow interaction with engaging and motivating rehabilitation gaming software using changes in grip strength as a method of control. This interaction requires and combines both cognitive capacity and use of a functional movement, thus complimenting traditional therapy.

The portable nature and ability to connect to mobile technology hardware means the hand-grip can be used easily not only by therapists in supervised gym environments, but left with patients at their bedside for unsupervised therapy, and also by patients in a home environment or even 'on-the-go' for self-motivated therapy.

It will be appreciated that the spring mechanism of the system of FIG. 7 can be modified so as to correspond to the arrangement of FIG. 1. Further modifications can be made to any of the embodiments described above, for example, referring to FIG. 9, in a further embodiment of the invention, which is only shown schematically but may correspond in detail to the rehabilitation aid of FIG. 7, the force measurement device, rather than comprising a load cell, is arranged to measure the distance between the two force input members 905, 906. For example the force measurement device may comprise an optical sensor arranged to measure the distance between two components 907, 908, one mounted on each of the force input members 905, 906. However other forms of distance measurement such as inductive or capacitive sensors can be used. It will be appreciated that, even if the force input members 905, 906 are not completely rigid, but somewhat flexible, there will be a fixed relationship between the force applied between the two input members 905, 906 and the distance between them as measured by the distance measurement device. In a modification to this arrangement, a further distance measurement device may be added at the opposite end of the device to the one shown. From the two measurements of separation of the input members, one at each end, an indication of the position of the input force, and a better measurement of its magnitude taking into account any flexibility of the input members 905, 906 themselves, can be obtained.

Figure 9:
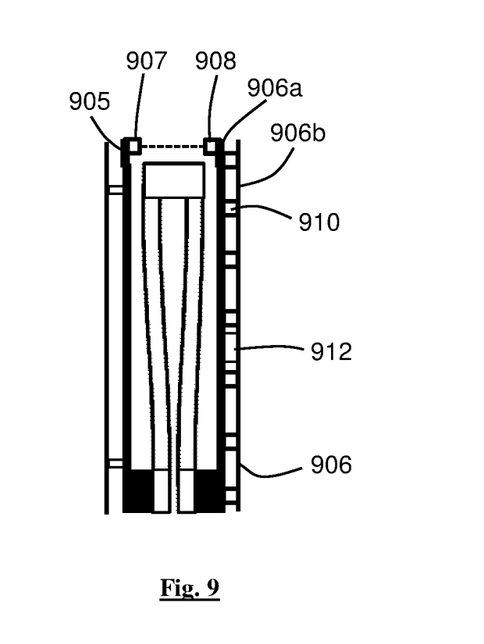
FIG. 9 shows a rehabilitation aid according to a further embodiment of the invention.

Also, in this embodiment, one of the force input members 906 comprises an inner member 906a, which is relatively rigid, and an outer layer or skin 906b which is relatively flexible and covers the whole of the outer surface of the inner member 906a. An array of actuators 910 is provided between the inner and outer members 906a, 906b each of which can be controlled to vary the distance between the inner and outer members 906a, 906b over a respective area. Since the outer member 906b is flexible, the actuators 910 can be operated independently of each other, or in a coordinated manner, so as to change the shape of the outer surface of the force input member 906. This allows different types of active feedback or stimulus to be given. For example any one or more of the actuators 910 can be controlled to provide a vibratory feedback or stimulus, or the shape of the force input member can be modified so as to adapt it to a particular user or a particular task. While only shown on one of the input members 906, this arrangement may be provided on both of the input members 905, 906.

A heating element 912 can also be embedded in the force input member 906. This is shown as located at a point near the centre of the input member, but could be in the form of a strip or sheet arranged to heat a corresponding area of the force input member so as to provide feedback or a stimulus, or comfort to a user. Again, this could be provided on either or both of the input members 905, 906.

The other end of the force input members 905 has a removable cover 914 over its outer surface, which in this case is attached to the input member 905 by snap-fit fastenings or clips 916. In a modification to this arrangement the cover 914 may simply be flexible and shaped to fit over the input member 905 itself. The cover 914 may be rigid and of a fixed shape, or it may be flexible, for example in the form of a film covering. Two or more removable covers may be provided with different shapes and/or textures and/or thicknesses, so that the force measuring device can be adapted for a variety of activities or users. Again, the removable covers may be provided on both of the input members 905, 906, either alone or in combination with the active outer member 906b. It will be appreciated that the compliant mechanisms disclosed herein may be scaled up or down to measure other body movements, for example a finger pinch gauge is easily conceived. In a different housing the mechanism could be used to assess and train foot and ankle movements by applying force on to a force measurement mechanism. This could be beneficial for improving car clutch control for example.

It will be appreciated the compliant mechanisms disclosed herein may have application in fields other than rehabilitation. For example the mechanism may be used in a general computer games controller or a general computer mouse or an interface to control a robotics system. Alternatively the mechanisms could be implemented in a foot pedal for controlling a cutting tool used in robotic surgery where highly sensitive force control is required, or in an interactive sports training device such as a device for training grip strength in climbers.

The invention claimed is:
1. A force measurement mechanism comprising:
   a first force input member and a second force input member, the first and second force input members being spaced apart in a force input direction;
   a pair of cantilever springs each having a first end portion and a second end portion;
   a sensor coupled to at least one of the force input members;
   a first constraining support and a second constraining support, wherein:
      the first end portion of each of the cantilever springs is held by the first constraining support and the second end portion of each of the cantilever springs is held by the second constraining support;
      each of the cantilever springs has an unconstrained length, between the first constraining support and the second constraining support, that is free to bend;
      the constraining supports hold the cantilever springs in a parallel arrangement and spaced apart in the force input direction;
      the force input members are attached to the first constraining support and the second constraining support so that movement of the force input members relative to each other in the force input direction is arranged to produce movement of the constraining supports relative to each other in the force input direction and to bend the cantilever springs;

the sensor is arranged to measure a force applied in the force input direction between the force input members; and the force input members form a hand-grip arranged to fit within a person's hand, and are each attached to a respective one of the constraining supports and extend parallel to the cantilever springs and spaced apart from them in an unloaded state, whereby the force input members remain substantially parallel when a force is applied between them.

2. The mechanism according to claim 1 wherein the unconstrained lengths of the cantilever springs are equal.

3. The mechanism according to claim 1 wherein the cantilever springs are arranged to remain parallel during bending when a force is applied between the force input members.

4. The mechanism according to claim 1 further comprising another pair of cantilever springs each having a first end portion and a second end portion, wherein the first end portion of each of the cantilever springs of the second pair of cantilever springs is held by the first constraining support and the second end portion of each of the cantilever springs of the second pair of cantilever springs is held by a third constraining support, each of the cantilever springs of the second pair of cantilever springs has an unconstrained length, between the first and third constraining supports, that is free to bend, and the constraining supports hold each of the pairs of cantilever springs in a parallel and spaced apart arrangement.

5. The mechanism according to claim 4 wherein the first constraining support constrains both of the pairs of cantilever springs relative to each other.

6. The mechanism according to claim 5 wherein the second and third constraining supports are each individual constraining supports which can move relative to one another when a force is applied between the force input members.

7. The mechanism according to claim 6 wherein the force input members are each rigidly attached to a respective one of the individual constraining supports.

8. The mechanism according to claim 1 wherein the force input members are arranged to fit within a person's hand.

9. The mechanism according to claim 4 wherein, when a force is applied between the force input members, the first and second pairs of cantilever springs are each arranged to bend in a respective bent shape, and the bent shape of the second pair of cantilever springs mirrors the bent shape of the first pair of cantilever springs.

10. The mechanism according to claim 1 further comprising a compliance adjustment member, fitted to the cantilever springs, which is operable to adjust an effective bending length of the cantilever springs.

11. The mechanism according to claim 10 wherein the compliance adjustment member has a series of openings and the cantilever springs extend through the openings.

12. The mechanism according to claim 10 further comprising a threaded spindle, wherein the compliance adjustment member has a threaded hole therein, and the position of the compliance adjustment member along the cantilever springs is controlled by the threaded spindle which engages with the threaded hole in the compliance adjustment member.

13. The mechanism according to claim 1 wherein the sensor is arranged to output force measurement data, the mechanism further comprising a wireless transmission device for transferring the force measurement data from the sensor to a remote device.

14. The mechanism according to claim 1 further comprising a motion sensing unit arranged to sense motion of the mechanism.

15. The mechanism according to claim 1 further comprising an actuator arranged to provide tactile feedback or stimulus to a user.

16. The mechanism according to claim 15 wherein the actuator is attached to one of the force input members.

17. The mechanism according to claim 15 wherein the actuator is arranged to produce at least one of: vibration, shape variation and size variation of at least one of the force input members.

18. The mechanism according to claim 1 further comprising a removable cover for at least one of the force input members whereby at least one of a shape and a size and a texture of the at least one force input member can be altered.

19. The mechanism according to claim 1 further comprising a heater arranged to heat one of the force input members thereby to provide feedback or stimulus to a user.

20. A system comprising: a computer device arranged to run a program and a force measurement mechanism according to claim 1, wherein the computer device is arranged to receive a force measurement signal from the sensor as an input when running the program.

* * * * *